R. W. PITTMAN.
TRIPOD FOR CAMERAS.
APPLICATION FILED SEPT. 1, 1920.

1,386,025.

Patented Aug. 2, 1921.
2 SHEETS—SHEET 1.

Inventor:
R. W. Pittman
By his Attorney
Wm H. Reid.

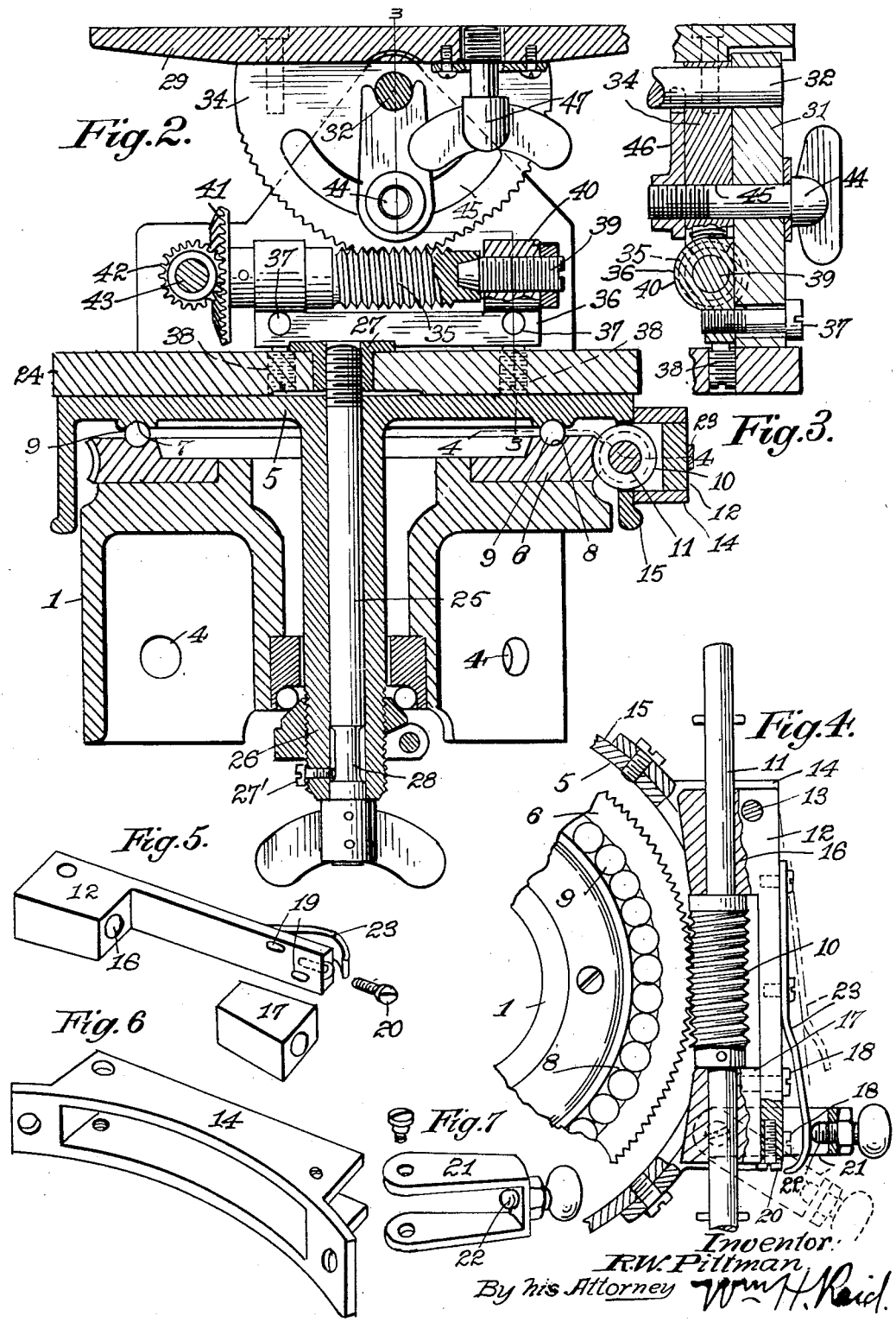

UNITED STATES PATENT OFFICE.

REINHART W. PITTMAN, OF NEW YORK, N. Y.

TRIPOD FOR CAMERAS.

1,386,025.  Specification of Letters Patent.   Patented Aug. 2, 1921.

Application filed September 1, 1920. Serial No. 407,438.

*To all whom it may concern:*

Be it known that I, REINHART W. PITTMAN, a citizen of the United States of America, and resident of New York city, in the county of New York and State of New York, have invented certain new and useful Improvements in Tripods for Cameras, of which the following is a full, clear, and exact description.

This invention relates to tripods for supporting various apparatus, and is specially designed for use with cameras, particularly those employed with moving picture machines.

One object of the present invention is to provide improved means for swinging the instrument on the supporting head in a substantially horizontal plane, which is arranged to automatically compensate for irregularity in the rotating member, and should prevent any lost motion in the turning means.

A further object is to provide the latter arrangement with means for easily and quickly releasing the turning member, that can be readily caused to reëngage when desired.

Another object of the invention is to provide improved means for swinging the instrument in a substantially vertical plane.

In the accompanying drawing showing one embodiment of my invention, Figure 1 is a perspective view of the device, part of the legs being omitted.

Fig. 2 is a vertical section through the device with the legs removed.

Fig. 3 is a partial section on the line 3—3 of Fig. 2.

Fig. 4 is a horizontal partial section as indicated on the line 4—4 of Fig. 2.

Fig. 5 shows a swinging arm for the feed screw shaft.

Fig. 6 shows the frame for the latter.

Fig. 7 shows the clamping piece for the arm.

Figure 1:
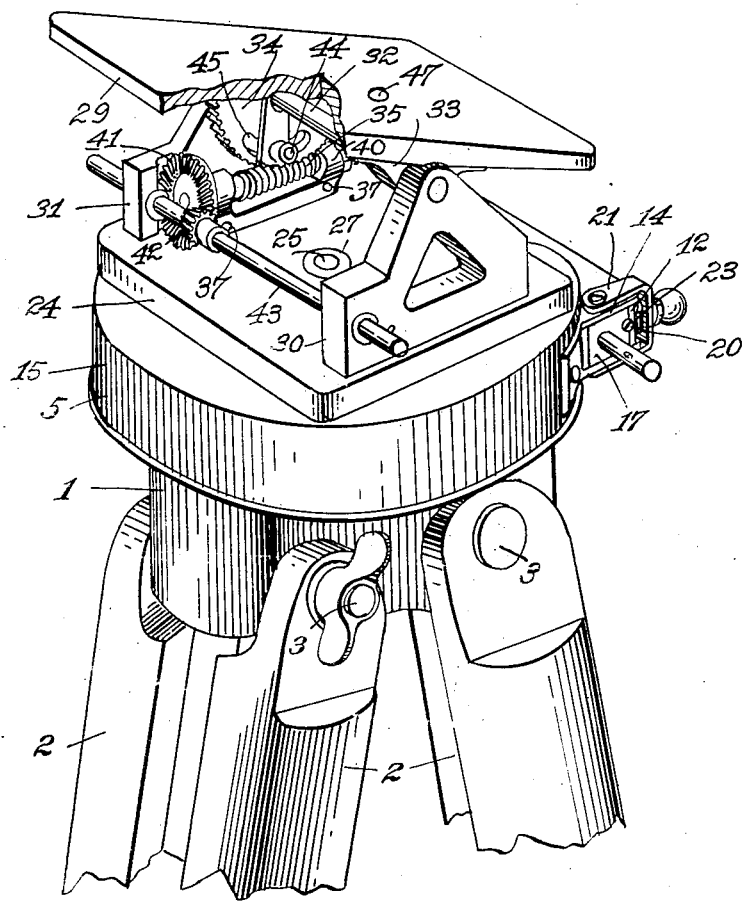

As shown in the drawings, the tripod is composed of a head 1 with means for suitably hinging supporting legs 2 that may swing on clamp bolts 3, passing through apertured portions 4 of the head.

On the head 1 is suitably mounted a base 5 to rotate thereon, and means are provided for swinging this head, shown in the form of a worm-wheel 6 secured on top of the head; but obviously this worm-wheel can be an integral part of the head if desired. The base 5 is provided with a circular ball race 7, and the worm-wheel has a ball race 8 arranged to receive a set of balls 9 that support the ball race 7 of the head. A worm or screw 10 is carried by a shaft 11, suitably supported in bearings to engage the worm-wheel 6. As shown this shaft is carried by an arm mounted to swing to move the worm to and from the worm-wheel. I further provide a resilient member to press the arm to force the worm against the worm-wheel. As shown I provide an arm 12, see Fig. 5, that is pivoted at 13, in a frame 14, see Fig. 6. This frame is suitably secured to a depending rim 15 of the head, as shown in Fig. 4. The shaft 11 is journaled in a bore 16 at the large end of this arm, while the other end of the shaft turns in the bore of a block 17. The latter is secured to the free end of the arm 12, so that the block can be adjusted along the arm to take up for wear in the worm shaft 11. An adjusting screw 20 is used to shift the block 17.

To press the arm and worm toward the worm-wheel, I provide a clamping piece in the form of a bail 21 that swings on the frame 14, see Fig. 4, and carries an adjusting screw 22 that engages a plate spring 23 secured by one end portion to the arm 12. This bail and screw will press the spring inwardly and hold the worm in engagement with the worm-wheel, by a yielding pressure that can be regulated by the screw. This bail 21 can be swung to release the spring 23, when the arm and worm can be swung outward to release the worm-wheel, and the base can be turned freely on the head. This is done to permit a wide swing of the base, and then the arm is again brought to engage the worm-wheel, for fine adjustment.

The base 5 is shown as having a carrier plate 24 mounted thereon by suitable means, such as a screw bolt 25 located in the sleeve 26 of the base which engages a threaded collar 27 on the carrier, whereby carrier plate can be readily removed, or adjusted on the base if desired. A screw 27' on the sleeve 26 engages a reduced portion 28 of the bolt 25, to prevent the bolt falling down through the collar when released from the carrier plate. This carrier plate is provided with means for having a supporting plate 29 mounted thereon to swing on a horizontal axis. On the plate 29 are a pair of bearing members 30, 31, that support a shaft 32 carried by ears 33, 34, fast on the bottom of the plate 29. The ear 34 is in the form of a segment with suitable teeth for engaging a worm 35 that rotates on the member 31. The worm 35 rotates in bearings on a plate 36, that is clamped to the member 31 by screws 37. The carrier plate 24, has adjusting screws 38 for shifting the plate 36 to cause the worm to have the proper engagement with the worm segment 34. One end of the worm 35 has a tapered socket that engages the tapered end of a screw 39 that is adjustable in the bearing 40 for the screw. This worm shaft carries a bevel gear 41 that engages a bevel gear 42 on a cross shaft 43, whereby the worm can be turned when desired.

The supporting plate 29 can be locked in adjusted positions by a clamping bolt 44 passing through the support 31 and through a slot 45 in the segment 34, the bolt screwing into a threaded piece 46 having a fork end engaging the shaft 32.

The supporting plate 29 is provided with a clamping bolt 47 for securing the camera or other instrument on this plate.

What I claim is:—

1. In a tripod, a head, a base rotatable on the head and adapted to support an instrument, a worm on one said member, a worm-wheel on the other member engaging the worm to turn the base on the head, a movable support for the worm, a spring member arranged to engage the worm support to hold the worm against the worm-wheel, and a swinging clamp normally engaging the spring member to hold the worm against the worm-wheel under tension by yieldable means, which clamp can swing out to release the support and free the worm from the worm-wheel.

2. In a tripod, a head, a base rotatable on the head, a worm-wheel fast on the head, an arm pivoted on the head, a worm shaft rotatable on said arm and thereby shiftable to and from the worm-wheel, a spring on said arm, and a clamping member hinged to the head to normally engage the said spring and press the worm against the worm-wheel, said clamp when swung serving to release the spring and arm to free the worm from the worm-wheel.

3. In a tripod, a head, a base rotatable on the head, a worm-wheel fast on the head, an arm pivoted on the head, a worm-wheel shaft rotatably mounted on said arm to be thereby shifted to engage and release the worm-wheel, and a hinged clamping member to coöperate with the said arm to hold the worm in engagement with the worm-wheel.

4. In a tripod, a head, a base rotatable on the head, a worm-wheel fast on the head, an arm pivoted on the head, a worm-wheel shaft rotatably mounted on said arm to be thereby shifted to engage and release the worm-wheel, a hinged clamping member to coöperate with the said arm to hold the worm in engagement with the worm-wheel, and a spring interposed between the clamping member and the arm to yieldably press the worm against the worm-wheel.

5. In a tripod, a head, a base rotatable on the head, a worm-wheel fast on the head, an arm pivoted on the head, a worm shaft rotatably carried by the arm and to be thereby held to engage the worm-wheel, a clamping member hinged to the head to engage the arm and hold the worm in engagement with the worm-wheel, a spring interposed between the clamp and the said arm to yieldably press the worm against the worm-wheel, screws between the base and the bearing plate for vertical adjustment of the bearing plate, and clamping screws between the bearing plate and the upright plates for clamping the bearing plate when adjusted by said screws.

6. In a tripod, a head, a base rotatable on the head, a worm-wheel fast on the head, an arm pivoted on the head, a worm shaft rotatably carried by the arm and to be thereby held to engage the worm-wheel, a clamping member hinged to the head to engage the arm and hold the worm in engagement with the worm-wheel, a spring interposed between the clamp and the said arm to yieldably press the worm against the worm-wheel, said worm shaft having a conical socket at one end, a bearing screw carried in a threaded piece on the bearing plate engaging the conical socket of the worm shaft for adjustment, and a lock nut on the screw to clamp it in adjusted positions.

Signed at New York city, N. Y., on August 31, 1920.

REINHART W. PITTMAN.